United States Patent
Hashiguchi et al.

(10) Patent No.: US 6,195,867 B1
(45) Date of Patent: Mar. 6, 2001

(54) METHOD OF PRODUCING A SPIRAL WOUND GASKET AND A DEVICE FOR PRODUCING THE SAME

(75) Inventors: Hideto Hashiguchi; Masahiko Takaoka; Keiji Okada; Shoji Kato; Masao Konaka, all of Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/258,274

(22) Filed: Feb. 26, 1999

(30) Foreign Application Priority Data

Mar. 17, 1998 (JP) .................................................. 10-089418

(51) Int. Cl.[7] .................................................. B21D 39/00
(52) U.S. Cl. ...................... 29/455.1; 242/584.1; 72/148
(58) Field of Search ..................... 29/455.1, 456, 29/458; 72/130, 148; 277/204, 610; 242/584.1, 586.1

(56) References Cited

U.S. PATENT DOCUMENTS

| | | |
|---|---|---|
| 2,741,023 | 4/1956 | Rafter . |
| 3,061,224 | 10/1962 | Herr . |
| 3,135,311 | 6/1964 | Green . |
| 3,331,564 | 7/1967 | Gross .................................. 242/584.1 |
| 3,752,416 | 8/1973 | Fukatsu et al. . |
| 4,038,852 | 8/1973 | Lear ....................................... 72/148 |
| 4,402,468 | 9/1983 | Tezuka et al. . |
| 4,470,193 | 9/1984 | Karel et al. . |
| 5,082,296 | 1/1992 | Aizawa et al. . |

*Primary Examiner*—I Cuda Rosenbaum
*Assistant Examiner*—Steven Blount
(74) *Attorney, Agent, or Firm*—Jones, Tullar & Cooper, P.C.

(57) ABSTRACT

A method of producing a spiral wound gasket for sealing fluid such as a liquid including water and oil, and a gaseous body including vapor and gas and a device for producing the spiral wound gasket. The tip portion of a hoop material is cut and raised thereby forming a checking stepped-portion. The checking stepped-portion is caught by a checking pawl, so as to wind the hoop material around a core drum. After winding the hoop material around the outer periphery of the core drum, at least once, the checking pawl is retracted from the outer periphery of the core drum, thereby separating the checking pawl from the checking stepped-portion. The spiral wound gasket produced by the present invention exhibits an excellent sealing property. Moreover, it also has an excellent durability.

7 Claims, 6 Drawing Sheets

METHOD OF PRODUCING A SPIRAL WOUND GASKET AND A DEVICE FOR PRODUCING THE SAME

BACKGROUND OF THE INVENTION

1. Field of the Invention

The present invention relates to a method of producing a spiral wound gasket for sealing fluid such as liquid including water and oil, and a gaseous body including vapor and gas.

Also, the present invention relates to a device for producing the spiral wound gasket.

2. Description of the Prior Art

In a joint portion of each laying pipe employed under a high temperature and a high pressure condition, a gasket is disposed between a pair of flanges, each flange is fastened by a bolt, and the gasket is closely fitted in each flange, thereby preventing a fluid flowing inside the pipe from leaking to the outside.

For the gasket, a spiral wound gasket is usually employed. As shown in FIGS. 9 and 10, the spiral wound gasket has a structure wherein a filler material 92 made of an asbestos paper, an expanded graphite tape, a 4-fluorinated ethylene resin tape, or the like is stuck on a hoop material 91 made of a long and thin stainless plate having a wave shaped or chevron shaped section so that they may be wound in a spiral state.

A general method of producing this spiral wound gasket is described below.

First, as shown in FIG. 11, the tip portion of the hoop material 91 is folded and inserted in a checking groove 93a of the outer periphery of a core drum 93, whereby the hoop material 91 is stopped by connecting it to the core drum 93. In this state, the core drum 93 is rotated so that only the hoop material 91 is wound around the outer periphery of the core drum 93 at least once. Then, the filler material 92 is stuck on the hoop material 91 so as to be wound in a spiral state. Thereafter, only the hoop material 91 is further wound two or three times. Moreover, the hoop material 91 and the filler material 92 wound 16 in a spiral state are removed from the core drum 93, thereby cutting off the folded area on the tip portion of the hoop material 91, which is inserted in the checking groove 93a of the core drum 93.

An initial portion of the hoop material 91 to be wound is fixed in a predetermined zone of the hoop material 91 by spot welding or the like. A last portion of the hoop material 91 to be wound is fixed in a predetermined zone of the preceding-round of the wound hoop material 91 by the welding spot or the like.

However, the conventional producing method mentioned above requires that the hoop material 91 and the filler material 92 wound in a spiral state are removed from the core drum 93, before positioning a step for cutting off the tip portion of the hoop material 91 inserted in the checking groove 93a of the core drum 93. Consequently, the number of steps is increased, and it is required to manually perform a cutting operation, thereby incurring an expensive production cost. Moreover, the cut-off portion of the hoop material 91 has to be wasted, which results in a problem wherein a yield of the hoop material 91 is worse.

In order to overcome the above problems, a method shown in FIG. 12 is proposed as below. A pressing force is applied to the tip portion of the hoop material 91, thereby forming a flat portion 91a. A checking hole 91b is formed on the flat portion 91a by piercing the hoop material. On the other hand, the core drum 93 is provided with a checking pin 94 whose tip can protrude or retract elastically from the outer periphery of the core drum 93. The checking pin 94 catches the checking hole 91b of the hoop material 91, thus permitting winding the hoop material 91 around the core drum 93. (See the gazette of Japanese Patent Publication No. H8-33180.)

According to the method, the step of cutting off the tip portion of the hoop material 91 is not required. However, it is required to form the flat portion 91a for providing the checking hole 91b by a step of applying pressure or the like to the tip portion. A width of the tip portion after forming the flat portion 91a, is greater than the reminder of the portion thereof, whereby local unevenness is generated on the sealing surface of the completed gasket owing to a shape of the tip portion thereof. As a result, there is a fear wherein the unevenness adversely affects the sealing property.

Furthermore, a great gap is generated between the flat portion 91a and the chevron portions 91c, 91c of a second-round hoop material 91 wound around the outer periphery thereof, whereby welding the flat portion 91a to the hoop material 91 on the outer periphery thereof is not ensured, thereby, in some cases, causing a problem wherein it is easy to separate the flat portion 91a therefrom.

In addition, though the second-round hoop material 91 directly wound around the outer periphery thereof unforcedly presses the checking pin 94 to move downwardly, the operation of winding the first-round hoop material 91 is not fully completed at the time when the checking pin 94 is pressed to move downwardly. Moreover, the hoop material 91 is intensively drawn, thereby increasing the contact pressure between the checking pin 94 and the checking hole 91b. In some cases, the unforced friction between the tip portion thereof and the checking hole 91b greatly damages the tip portion of the checking pin 94, when the checking pin 94 is pressed to move downwardly, with the result that there are problems wherein the durability of the device is bad and the operation of replacing the checking pin 94 is required.

SUMMARY OF THE INVENTION

The present invention from a consideration of the above circumstances.

An object of the present invention is to provide a method of producing a spiral wound gasket for ensuring excellent sealing property and a device for producing the same.

Another object of the present invention is to provide a method of producing a spiral wound gasket wherein there is no fear that a tip portion of a hoop material is separated from an outer periphery of the hoop material, and to a device for producing the same.

A further object of the present invention is to provide a method of producing a spiral wound gasket which is excellent in durability, and a device for producing the same.

In order to achieve the noted objects, a method of producing a spiral wound gasket of the present invention, wherein a tip portion of a hoop material having a chevron or wave shaped section is stopped by connecting it to a core drum for winding the hoop material, the core drum being rotated so as to wind the hoop material around an outer periphery of the core drum at least once, thereby overlapping a filler material onto the hoop material so that both of them are wound in a spiral state, comprises the steps of:

forming a checking stepped-portion by cutting and raising a chevron portion of the tip portion of the hoop material or a valley portion thereof, rotating the core drum in a state wherein the checking stepped-portion of the hoop material is caught by a checking pawl which makes the tip portion protrude from the outer periphery of the core drum, thereby winding the hoop material around the outer periphery of the core drum at least once, overlapping the filler material onto the hoop material together so that both of them are wound in a spiral state, retracting the checking pawl from the outer periphery of the core drum into the inner periphery of the core drum at a predetermined time after winding the hoop material around the outer periphery of the core drum at least once, thereby separating the checking pawl from the checking stepped-portion.

According to the method of producing the spiral wound gasket, the checking stepped-portion being caught by the checking pawl is formed by cutting and raising the chevron portion or the valley portion of the tip portion of the hoop material. Therefore, forming a flat portion on the tip portion of the hoop material is not required. This enables a width of the tip portion of the hoop material to correspond to the remaining portion thereof, thereby preventing local unevenness from being generated on the sealing surface of the gasket. Furthermore, a great gap is never generates between the tip portion of the hoop material and the hoop material wound around the outer periphery thereof, thereby making it possible to surely weld the tip portion of the hoop material to the hoop material of the outer periphery thereof. Still furthermore, at a predetermined time after winding the hoop material around the outer periphery of the core drum at least once, the checking pawl is recessed from the outer periphery of the core drum with the result that the checking pawl can be separated from the checking stepped-portion in a state of decreasing the contact pressure between the checking pawl and the checking r stepped-portion. Consequently, there is no fear that the friction between it and the hoop material greatly damages the checking pawl.

Preferably, the step of cutting and raising chevron portions of the tip portion of the hoop material or a valley portion thereof is performed at the same time while a step of separating a preceding hoop material from a following hoop material by cutting is performed.

This enables the gasket to be efficiently produced, in comparison with the case wherein the step of cutting and raising the chevron portion or the valley portion and the step of cutting the hoop material are separately performed.

The hoop material is provided with plural chevron portions, and the checking stepped-portion may be formed on at least one of the plural chevron portions of the hoop material. Alternatively, the checking stepped-portions may be formed on all the plural chevron portions of the hoop material. When the checking stepped-portion is formed in this manner, the tip portion of the hoop material is surely and firmly stopped by connecting it to the checking pawl.

Preferably, the step of cutting and raising the chevron portion of the tip portion of the hoop material or the valley portion thereof is performed after the hoop material having the flat section is shaped into one having a chevron or wave shaped section, and before the core drum 2 is supplied with the shaped hoop material.

According to a device for producing a spiral wound gasket of the present invention, wherein a tip portion of a hoop material having a chevron or wave shaped section is stopped by connecting it to a core drum for winding the hoop material, the core drum being rotated so as to wind the hoop material around an outer periphery of the core drum at least once, thereby overlapping a filler material onto the hoop material so that both of them are wound in a spiral state, comprises:

a checking stepped-portion forming means for forming a checking stepped-portion by cutting and raising a chevron portion of the tip portion of the hoop material or a valley portion thereof, a checking pawl housed in the core drum, having a tip portion which can protrude or retract from the outer periphery of the core drum, for catching the checking stepped-portion of the hoop material by the tip portion, in a state wherein the tip portion is protruded from the outer periphery of the core drum, and a checking pawl driving means for making the checking pawl protrude or retract from the outer periphery of the core drum.

According to the device for producing the spiral wound gasket, the checking stepped-portion forming means makes the tip portion of the hoop material to be cut and raised, thereby making it possible to form the checking stepped-portion. Moreover, the checking pawl driving means makes the tip portion of the checking pawl protrude from the outer periphery of the core drum, whereby the checking stepped-portion of the hoop material can be caught by the tip portion of the checking pawl. In this state, the core drum is rotated thereby making it possible to wind the hoop material around the outer periphery of the core drum at least once. Thereafter, the filler material is stuck on the hoop material. This can lead to alternatively winding them around it in a spiral state. In addition, at the predetermined time after winding the hoop material around the outer periphery of the core drum at least once, the checking pawl driving means makes the checking pawl retract from the outer periphery of the core drum, thereby enabling the checking pawl to be separated from the checking stepped-portion.

Thus, the device of producing the spiral wound gasket does not require forming the flat portion on the tip portion of the hoop material, because the gasket has a structure wherein the checking stepped-portion formed by cutting and raising the chevron portion or the valley portion of the tip portion of the hoop material catches the checking pawl. Therefore, the axial width of the tip portion of the hoop material can be kept to correspond to the remaining portion with the result that local unevenness is not generated on the sealing surface of the gasket, and a great gap is not generated between the tip portion of the hoop material and the second-round hoop material directly wound around the outer periphery thereof. Then, the tip portion of the hoop material can be surely fixed in the predetermined portion of the second-round hoop material on the outer periphery thereof by spot welding or the like. Furthermore, at the predetermined time after winding the hoop material around the outer periphery of the core drum at least once, the checking pawl is structurally retracted from the outer periphery of the core drum so as to separate the checking pawl from the checking stepped-portion. Consequently, in the state wherein the contact pressure between the hoop material and the checking pawl is decreased, the checking pawl can be separated from the checking stepped-portion. Therefore, there is no fear that the checking pawl is damaged by the forced friction between it and the hoop material.

Preferably, the checking pawl driving means includes:

a slider housed in the core drum in a state of mounting the checking pawl thereon, being movable in a radial direction of the core drum, an eccentric cam engaged with the slider, so as to be eccentric to an axis of the core drum, and a rotatable shaft concentrically disposed on the axis of the core drum, for rotating the eccentric cam.

In this manner, the rotatable shaft makes the eccentric cam rotate thereby moving the slider to a radial direction of the core drum and enabling the checking pawl to protrude or retract from the outer periphery of the core drum. Therefore, a simple mechanism enables the checking pawl to protrude or retracted from the outer periphery of the core drum.

Preferably, the checking stepped-portion forming means includes:

a forming punch being vertically movable, and a receiving die disposed so as to be opposed to the forming punch, a cutting blade accompanied with the forming punch of the checking stepped-portion forming means, being vertically movable, and a receiving blade integrally disposed on the receiving die, and functioning as a pair with the cutting blade.

The above and other features and advantages of the present invention will become more apparent from the following description of preferred embodiments.

DETAILED DESCRIPTION OF THE PREFERRED EMBODIMENTS

Figure 1:
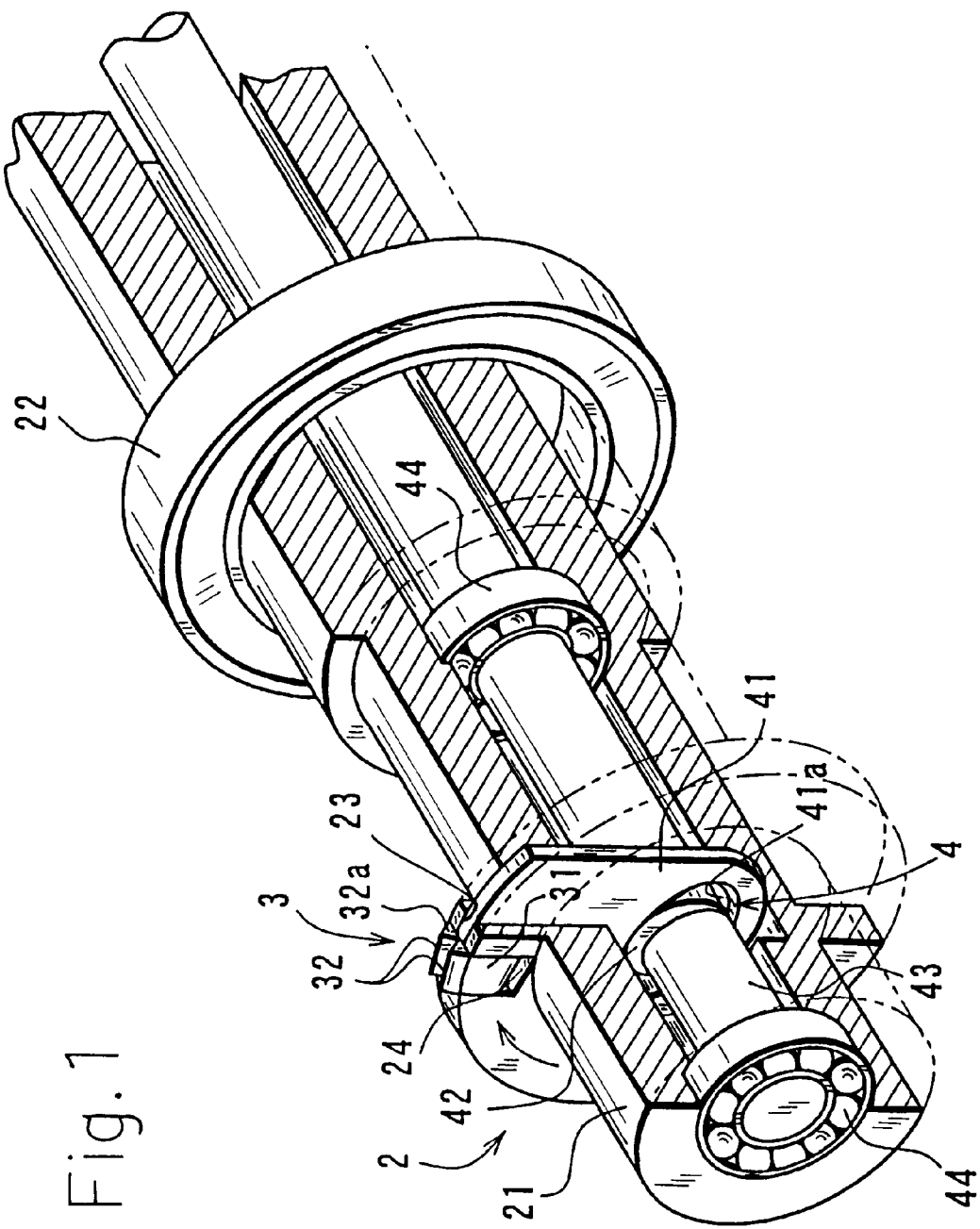
FIG. 1 is a cut perspective view of an essential portion of one embodiment of a device for producing a spiral wound gasket according to the present invention.

Referring now to the drawing, preferred embodiments of the present invention are described below.

Figure 2:
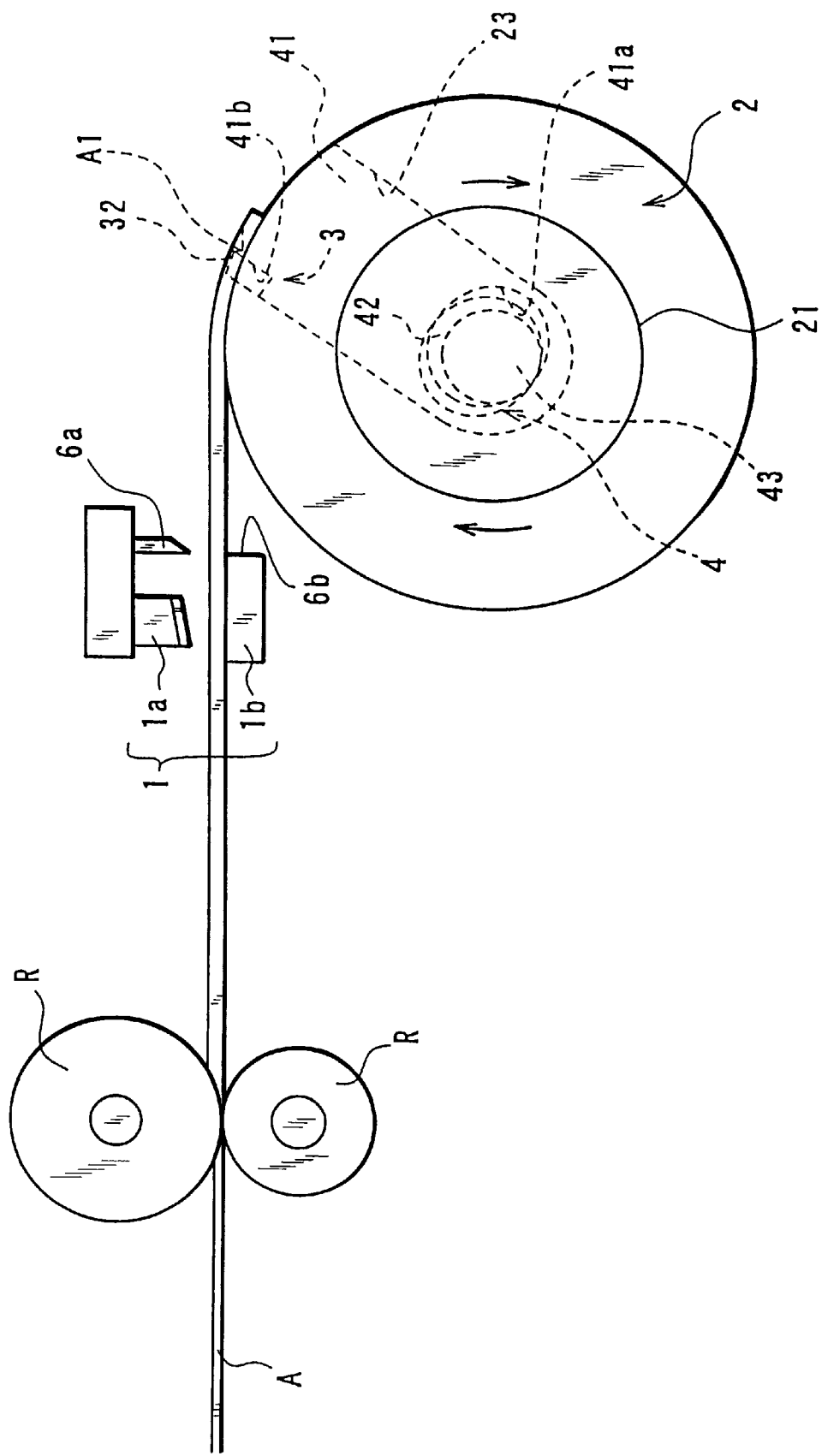
FIG. 2 is a schematic front view of the device for producing a spiral wound gasket.
Figure 3A:
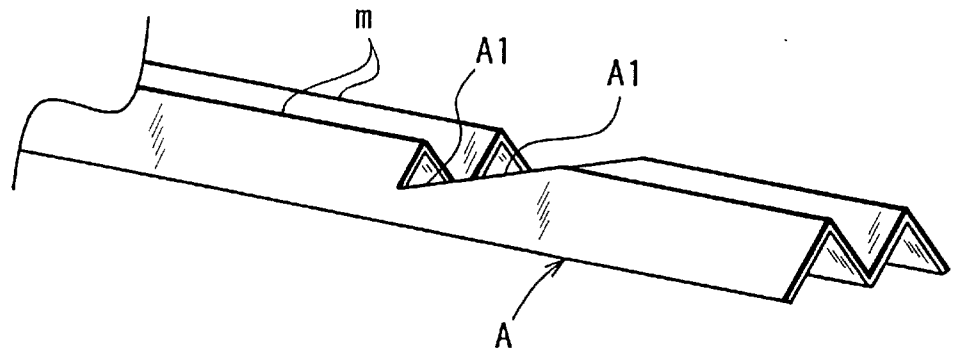
FIG. 3A is a perspective view of a checking stepped-portion.
Figure 3B:
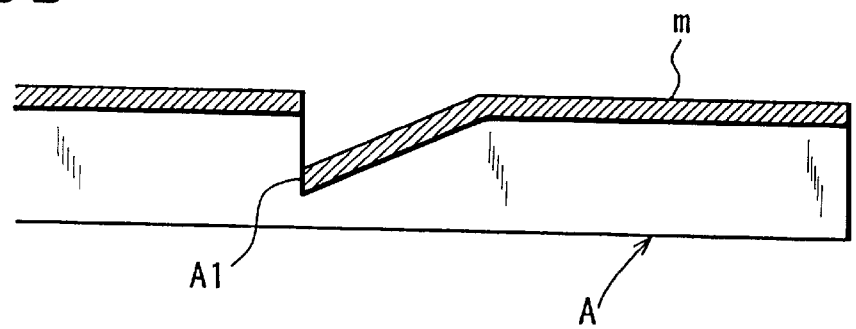
FIG. 3B is a sectional view of the checking stepped-portion.

FIG. 2 is a schematic front view of a producing device for producing a spiral wound gasket. The producing device is used for winding both a hoop material A and a filler material B shown in FIG. 5, which are overlapped with each other, in a spiral state. A main portion of the producing device comprises a checking stepped-portion forming means 1 for forming checking stepped-portions A1 shown in FIG. 3A and 3B on a tip portion of the hoop material A, a core drum 2 for winding the hoop material A and the filler material B, a checking pawl 3 housed in the core drum 2, whose tip portion can protrude or retract from an outer periphery of the core drum 2, and a checking pawl driving means 4 for protruding or retracting the tip portion of the checking pawl 3 from the outer periphery of the core drum.

The hoop material A has a flat sectional shape when it is drawn from a wound roll. Such a hoop material A is shaped so as to have a wave shaped section including two chevron portions m, m formed by means of a pair of rollers R. (See FIG. 3). The hoop material A is subjected to such a shaping process, before reading the core drum 2. The quality of the material of the hoop material A is selected from among stainless steel including SUS 304, Inconel, aluminum or the like. Stainless steel is particularly preferable in view of its heat-resistance and cost.

Figure 4:
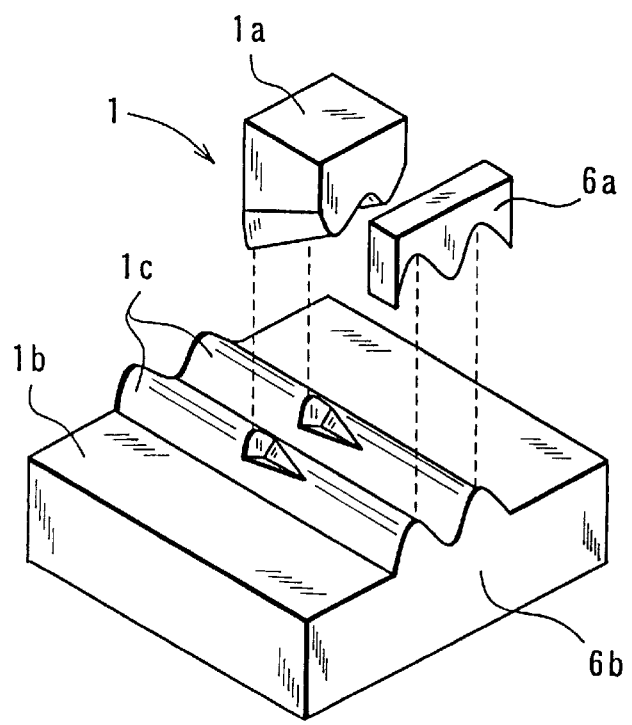
FIG. 4 is a perspective view of a checking stepped-portion forming means.

As specifically shown in FIG. 4, the checking stepped-portion forming means 1 includes a forming punch 1a being vertically movable by a driving portion which is not shown in the figures, and a receiving die 1b disposed so as to be opposite to the forming punch 1a. The forming punch 1a and the receiving die 1b are positioned between the core drum 2 and the roller R. In the checking stepped-portion forming means 1, the two chevron portions m, m of the tip portion of the hoop material A are respectively cut and raised in an inwardly inclined state, thereby forming the checking stepped-portions A1 shown in FIGS. 3A and 3B. A checking surface of each checking stepped-portion A1 is cut and raised at right angles to a. longitudinal direction of the hoop material A, so as to be easily caught by the tip portion of the checking pawl 3. The receiving die 1b is provided with two chevron portions 1c, 1c so as to correspond to the shape of the inner surface of the hoop material A.

Moreover, between the forming punch 1a or the receiving die 1b and the core drum 2, a cutting blade 6a and a receiving blade 6b for separating the preceding hoop material A from the following hoop material A by cutting, are attachably or detachably disposed. (See FIGS. 2 and 4). In this embodiment, the cutting blade 6a is fixed in the driving portion so as to accompany the forming punch a of the checking stepped-portion forming means 1 and move vertically. Furthermore, the receiving blade 6b is integrated with the receiving die 1b of the checking stepped-portion forming means 1.

As shown in FIG. 1, the core drum 2 is annular, whose outer diameter and width respectively correspond to an inner diameter and a width of a gasket G to be produced (cf. FIG. 6), and whose inner periphery is integrated with a hollow supporting body 21. The supporting body 21 is rotatably supported by an axial box (not shown) via a bearing 22, and rotatably driven in a clockwise direction in FIG. 2 by the driving portion (not shown). The inside of the core drum 2 is provided with a slit 23 for introducing a slider 41 a described below; from the outer periphery side to an axial core portion.

The checking pawl 3 has a substantially parallelepiped base portion 31 whose tip portion is provided with two checking protrusive-portions 32, 32 for checking each checking stepped-portion A1 of the hoop material. A checking end surface 32a of the checking projecting portion 32 is orientated in a substantial radial direction of the core drum 2. In addition, the checking pawl 3 is slidably introduced into a recessed groove 24 formed from the outer periphery of the core drum 2 to either side surface.

The checking pawl driving means 4 includes the slider 41 housed in the core drum 2, an eccentric cam 42 engaged with the slider 41, and a rotatable shaft 43 for rotating the eccentric cam 42 at a predetermined angle.

The slider 41 is like a flat plate, which is fitted into the slit 23 formed on the core drum 2 so as to be slidable in a radial direction of the core drum 2. Moreover, a base end portion of the slider 41 has an engaging hole 41a being a long hole, and the engaging hole 41a is relatively rotatably fitted into the eccentric cam 42. Furthermore, one of the angled portions of the tip ends of the slider 41 is provided with a recessed portion 41b (see FIG. 2), and the checking pawl 3 is fixed in the recessed portion 41b.

The rotatable shaft 43 is aligned with the supporting body 21 in the hollow inside of the supporting body 21. The rotatable shaft 43 is relatively rotatably supported by the supporting body 21 via a bearing 44. Additionally, independently of the supporting body 21, it is rotatable owing to the driving portion not shown. The eccentric cam 42 is integrally and rotatably fixed in the rotatable shaft 43 in a state wherein the eccentric cam 42 is eccentric to the axial core of supporting body 21 in a predetermined amount.

According to the checking pawl driving means 4, the rotatable shaft 43 is rotated, thereby making it possible to slide the slider 41 in a radial direction of the core drum 2 via the eccentric cam 42. This makes the checking protrusive-portion 32 of the checking pawl 3 protrude or retract from the outer periphery of the core drum 2. Therefore, a simple structure enables the checking pawl 3 to be protruded or retracted from the outer periphery of the core drum 2.

Next, a method of producing the spiral wound gasket by employing the producing device of the above structure is described, referring to FIGS. 2 to 6.

First, the hoop material A drawn from the wound roll is shaped by a pair of rollers R so as to have a wave shaped section, before each of two chevron portions m, m of the tip portion of the hoop material A is cut and raised by the forming punch 1a and the receiving die 1b of the checking stepped-portion forming means 1, thus forming the checking stepped-portions A1. (See FIGS. 2 and 3.)

Then, in a state wherein each checking stepped-portion A1 is stopped by connecting it to the checking protrusive-portion 32 of the checking pawl 3 slightly protruding from the outer periphery of the core drum 2 (cf. FIG. 2), the core drum 2 is drivingly rotated, thereby winding the hoop material A around the outer periphery of the core drum 2 at least once. At that moment, each checking stepped-portion A1 formed on each chevron portion m of the hoop material A is stopped to connect it to the checking protrusive-portion 32 of the checking pawl 3. As a result, the tip portion of the hoop material A can be surely and firmly caught and stopped by the checking pawl 3. Therefore, the hoop material A can be surely wound.

When winding of the hoop material A at least once is completed, an initial portion of the hoop material A to be wound (i.e., the tip portion) is subjected to spot welding for welding the initial portion thereof to a predetermined position of the second-round hoop material A wound around the outer periphery for the second time. At this time, the sectional surface of the tip portion of the hoop material A including the checking stepped-portions A1 is kept wave-shaped, whereby the tip portion of the hoop material A can fit onto the second-round thereof without any great gap. Therefore, both of them can be easily and surely welded to each other.

Figure 5:
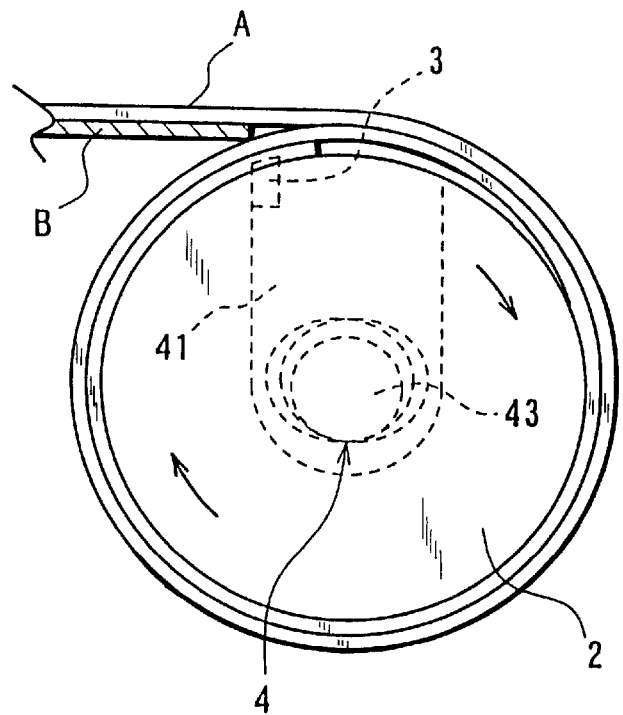
FIG. 5 is a schematic front view illustrating a step of producing the gasket.

Then, a lower surface of the hoop material A is supplied with filler material B, and as shown in FIG. 5, the both of them are overlapped with each other so that they are wound in a spiral state at a predetermined number of times. Thereafter, supply of filler material B is stopped, and only the hoop material A is wound at plural times. The filler material B is selected from among ceramic, expanded graphite, asbestos, 4-fluorinated ethylene resin or the like Particularly, ceramic is preferable in view of strength.

When the single winding of the hoop material A is completed, the preceding hoop material A is cut and separated from the following hoop material A by the cutting blade 6a and the 6 receiving blade 6b, at the same time while each checking stepped-portion A1 is formed on the tip portion of the following hoop material A by the forming punch 1a and the receiving die 1b. Thus, cutting the hoop material A and forming the checking stepped-portions A1 are simultaneously performed, thereby improving productivity in comparison with the case of performing them separately in a staggered state.

A last portion of the preceding hoop material A to be wound (i.e., a back end portion) is pressed against a wound portion of the hoop material A which directly underlies the last portion of the hoop material A, thereby applying the spot welding to both of them. Consequently, the spiral wound gasket G shown in FIG. 6 is obtained.

Figure 6:
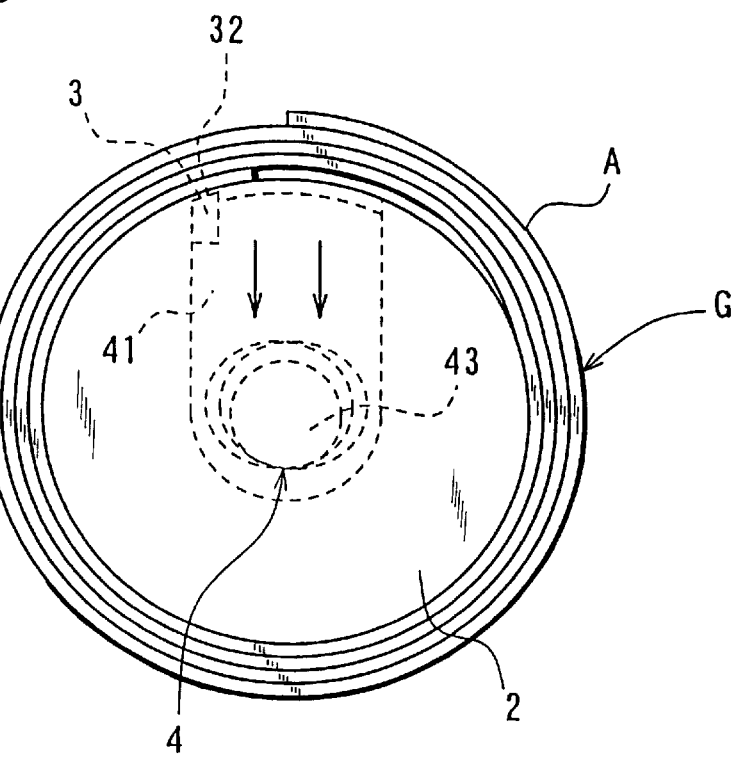
FIG. 6 is a schematic front view illustrating a step of producing the gasket.

Moreover, on or after the time when the hoop material A is wound at least once rotatable, the rotative shaft 43 is rotated, thereby protruding or retracting the checking protrusive-portion 32 of the checking pawl 3 from the outer periphery of the core drum 2 as shown in FIG. 6, with the result that the checking pawl 3 can be separated from the checking stepped-portion A1 of the hoop material A.

By the way, the hoop material A is wound around the core drum 2 at least once while applying an appropriate tensile force (preferably, 40 to 60 Kg/cm$^2$) thereto. Therefore, in making the checking projecting portion 32 protrude or retract from the outer periphery of the core drum 2, the portion already wound around the core drum 2 in the hoop material A is more firmly wound around the outer periphery of the core drum 2 by friction force. In other words, it prevents the hoop material A from slipping off the core drum 2. Therefore, in a state wherein a contact pressure between the checking pawl 3 and the checking stepped-portion A1 is slightly less than that therebetween in a beginning stage to wind the hoop material A, the checking protrusive-portion 32 is smoothly retracted to an inside of the core drum 2, the checking pawl 3 can be cut and separated from the checking stepped-portions A1. In this manner, according to the present configuration, under a state wherein the checking pawl 3 and the checking stepped-portions A1 firmly touch each other, they are separated, thereby preventing forced friction or the like from being produced. This can prevent the checking pawl 3 from being damaged early, and enhance durability of the device.

Finally, after the gasket G is removed from the core drum 2, the above operations are repeated, thus making it possible to produce subsequently the gasket G.

According to the above producing method, the tip portion of the hoop material A can be caught by the checking pawl 3 without forming a flat portion on the tip portion of the hoop material A owing to applying pressure, whereby the width of the tip portion of the hoop material A can be adjusted so as to correspond to the remaining portion. As a result, this can prevent local unevenness from being generated on the sealing surface of the gasket G, and ensure an excellent sealing property.

The above embodiment illustrates a case wherein the checking stepped-portions A1 are respectively formed on the two chevron portions m, m of the hoop material A. Alternatively, even in case of forming the checking stepped-portion A1 on only one of the chevron portions m, m, the tip portion of the hoop material A can be, surely and firmly to a certain degree, caught by the checking pawl 3. Therefore, the checking stepped-portion A1 may be formed on at least one of the plural chevron portions m, m.

Figure 7:
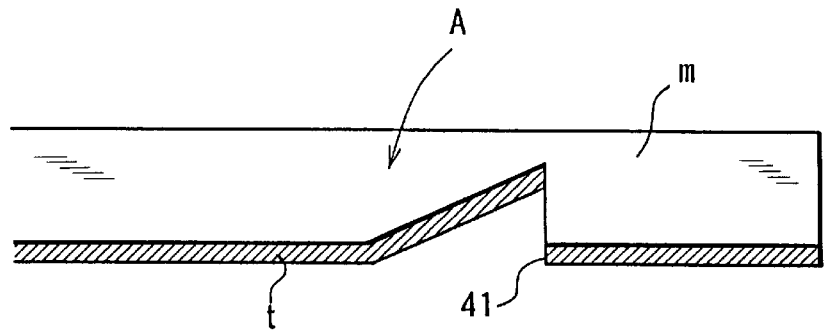
FIG. 7 is a sectional view illustrating another embodiment of the checking stepped-portion.

In addition, as shown in FIG. 7, the checking stepped-portion A1 may be formed by cutting and raising a valley portion t of the tip portion of the hoop material A upwardly. Furthermore, the checking pawl driving means 4 has a structure wherein, instead of the eccentric cam 42, a wedge drivingly slidable in an axial direction of the supporting body 21 may be used so that the slider 41 can be slid in a radial direction of the core drum 2 by the wedge. Alternatively, different kinds of modified designs including a structure wherein the checking stepped-portion forming means 1 comprises a pair of rollers can be applied.

Figure 8:
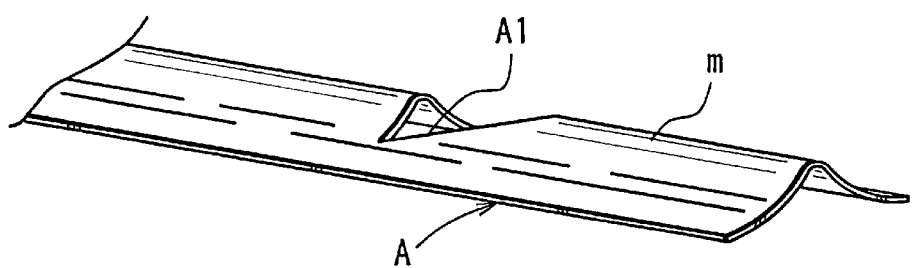
FIG. 8 is a perspective view illustrating still another embodiment of the checking stepped-portion.
Figure 9:
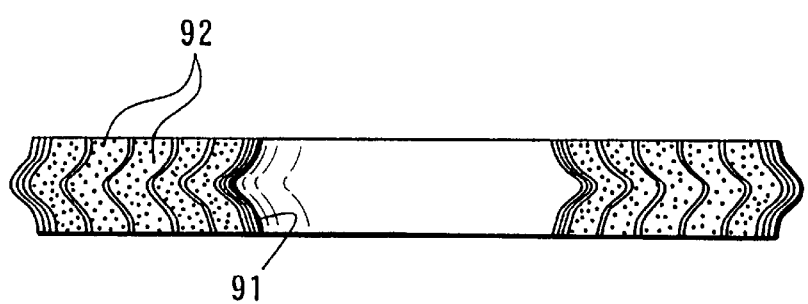
FIG. 9 is a sectional view of a hoop material.
Figure 10:
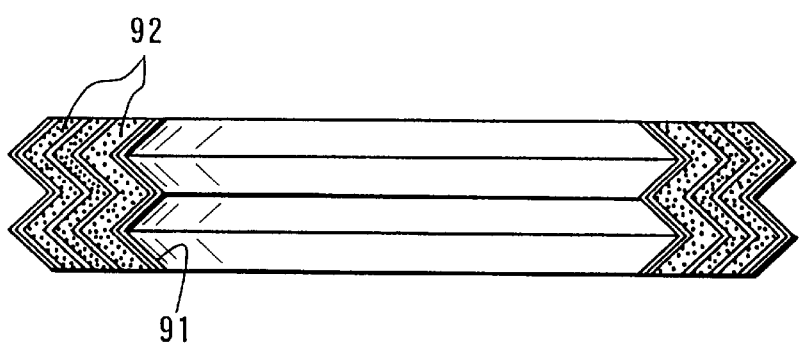
FIG. 10 is a sectional view of another hoop material.
Figure 11:
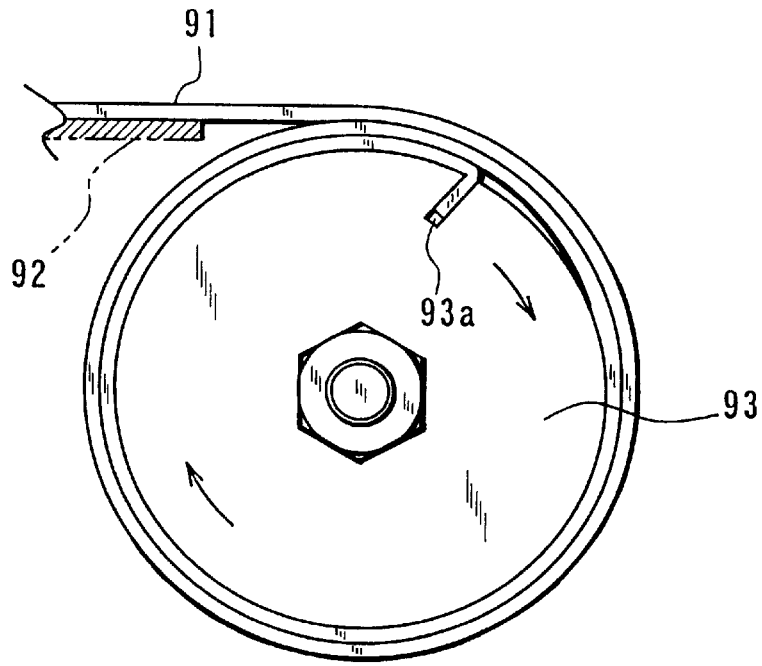
FIG. 11 is a schematic front view illustrating a conventional example.
Figure 12:
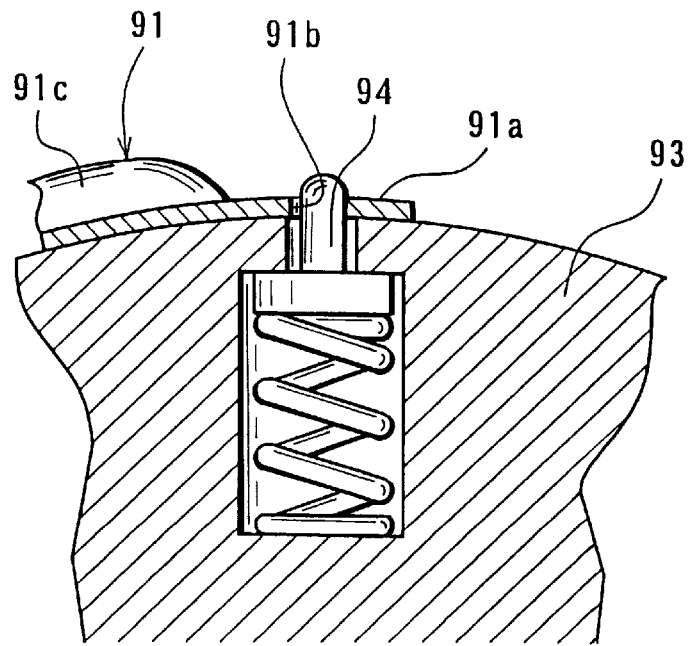
FIG. 12 is a sectional view illustrating an essential portion of another conventional example.

Additionally, the present invention can be applied to the hoop material A having a chevron shaped section as shown in FIG. 8.

What is claimed is:

1. A method of producing a spiral wound gasket, wherein a tip portion of a hoop material having a chevron or wave shaped section is stopped by connecting it to a core drum for winding the hoop material, comprising the steps of:

forming a checking stepped-portion by cutting and raising a chevron portion of the tip portion of the hoop material or a valley portion thereof;

rotating the core drum in a state wherein the checking stepped-portion of the hoop material is caught by a checking pawl which makes a tip portion thereof protrude from the outer periphery of the core drum, thereby winding the hoop material around the outer periphery of the core drum at least once;

overlapping the filler material onto the hoop material together so that both the hoop material and the filer material are wound in a spiral state; and retracting the checking pawl from the outer periphery of the core drum into the inner periphery of the core drum at a predetermined time after winding the hoop material around the outer periphery of the core drum at least once, thereby separating the checking pawl from the checking stepped-portion.

2. A method of producing a spiral wound gasket according to claim 1, wherein the step of cutting and raising a chevron portion of the tip portion of the hoop material or a valley portion thereof, is performed at the same time while a step of separating a preceding hoop material from a following hoop material by cutting is performed.

3. A method of producing a spiral wound gasket according to claim 1, wherein the hoop material is provided with the plural chevron portions, and the checking stepped-portion is formed on at least one of the plural chevron portions of the hoop material.

4. A method of producing a spiral wound gasket according to claim 1, wherein the hoop material is provided with the plural chevron portions, and the checking stepped-portions are formed on all of the plural chevron portions of the hoop material.

5. A method of producing a spiral wound gasket according to claim 1, wherein the step of cutting and raising the chevron portion of the tip portion of the hoop material or the valley portion thereof is performed after the hoop material having the flat section is shaped into one having a chevron or wave shaped section, and before the core drum is supplied with the shaped hoop material.

6. A device for producing a spiral wound gasket, wherein a tip portion of a hoop material having a chevron or wave shaped section is stopped by connecting it to a core drum for winding the hoop material, the core drum being rotated so as to wind the hoop material around an outer periphery of the core drum at least once, comprising:

a checking stepped-portion forming means for forming a checking stepped-portion by cutting and raising a chevron portion of the tip portion of the hoop material or a valley portion thereof;

a checking pawl housed in the core drum, having a tip portion which can protrude or retract from the outer periphery of the core drum, for catching the checking stepped-portion of the hoop material by said tip portion, in a state wherein said tip portion protrudes from the outer periphery of the core drum; and a checking pawl driving means for making the checking pawl protrude or retract from the outer periphery of the core drum, wherein the checking pawl driving means includes a slider housed in the core drum in a state of mounting the checking pawl thereon, being movable in a radial direction of the core drum, an eccentric cam engaged with the slider, so as to be eccentric to an axis of the core drum, and a rotatable shaft concentrically disposed on the axis of the core drum, for rotating the eccentric cam, wherein rotation of the core drum winds the hoop material around the periphery of the core drum at least once, thereby overlapping a filler material onto the hoop material so that both the hoop material and the filler material are wound in a spiral state.

7. A device for producing a spiral wound gasket according to claim 6, wherein the checking stepped-portion forming means includes:

a forming punch being vertically movable, and a receiving die disposed so as to be opposed to the forming punch;

a cutting blade accompanied with the forming punch of the checking stepped-portion forming means, being vertically movable; and a receiving blade integrally disposed on the receiving die, and functioning as the pair to the cutting blade.

* * * * *

UNITED STATES PATENT AND TRADEMARK OFFICE
CERTIFICATE OF CORRECTION

PATENT NO. : 6,195,867 B1
DATED : March 6, 2001
INVENTOR(S) : Hideto Hashiguchi et al.

It is certified that error appears in the above-identified patent and that said Letters Patent is hereby corrected as shown below:

Claim 1,
Line 29, "filer" should be "filler".

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*